(12) United States Patent
Goossen et al.

(10) Patent No.: US 7,658,347 B2
(45) Date of Patent: Feb. 9, 2010

(54) MICRO AIR-VEHICLE TRANSPORT CONTAINER AND LAUNCH SYSTEM

(75) Inventors: Emray R. Goossen, Albuquerque, NM (US); Glen A. Mantych, Placitas, NM (US); William T. Campbell, Albuquerque, NM (US)

(73) Assignee: Honeywell International, Inc., Morristown, NJ (US)

( * ) Notice: Subject to any disclaimer, the term of this patent is extended or adjusted under 35 U.S.C. 154(b) by 285 days.

(21) Appl. No.: 11/492,490

(22) Filed: Jul. 25, 2006

(65) Prior Publication Data

US 2009/0314882 A1    Dec. 24, 2009

(51) Int. Cl.
*B64F 1/04* (2006.01)
(52) U.S. Cl. .................. 244/63; 244/53 A; 206/335
(58) Field of Classification Search .............. 244/137.4, 244/63; 446/39, 38, 40–45, 429, 430; 206/335
See application file for complete search history.

(56) References Cited

U.S. PATENT DOCUMENTS

| | | | | |
|---|---|---|---|---|
| 3,182,422 | A * | 5/1965 | Ryan | 446/27 |
| 3,589,059 | A * | 6/1971 | Caswell | 446/39 |
| 4,114,309 | A * | 9/1978 | Gay | 446/232 |
| 5,119,935 | A * | 6/1992 | Stump et al. | 206/335 |
| 5,545,068 | A * | 8/1996 | Asbaghi | 446/39 |
| 5,695,153 | A | 12/1997 | Britton et al. | |
| 6,260,797 | B1 | 7/2001 | Palmer | |
| 6,286,410 | B1 | 9/2001 | Leibolt | |
| 6,457,673 | B1 | 10/2002 | Miller | |
| 6,506,237 | B2 | 1/2003 | Myers | |
| 6,712,312 | B1 * | 3/2004 | Kucik | 244/1 R |
| 7,128,294 | B2 * | 10/2006 | Roeseler et al. | 244/49 |
| 7,152,827 | B2 * | 12/2006 | McGeer | 244/49 |
| 7,210,654 | B1 * | 5/2007 | Cox et al. | 244/63 |
| 7,410,124 | B2 * | 8/2008 | Miller et al. | 244/63 |

FOREIGN PATENT DOCUMENTS

WO    WO 02/062663 A1    8/2002

OTHER PUBLICATIONS

European Search Report dated Sep. 28, 2007 for 07106798.7-2422.
Chandler J. G. "Micro Planes Popular Science, Times Mirror Magazines," New York, vol. 252, No. 1, Jan. 1998, p. 54-59x XP000749273.
Coppiner R., "Down Sizing," Flight International, Reed Business Information, Sutton Surrey, GB, vol. 168, No. 50, Oct. 25, 2005, p. 32-34, XP001236285.

* cited by examiner

*Primary Examiner*—Michael R Mansen
*Assistant Examiner*—Michael Kreiner
(74) *Attorney, Agent, or Firm*—Shumaker & Sieffert, P.A.

(57) ABSTRACT

A Micro Air-Vehicle (MAV) starting system that provides the combined functions of: packing protection of sensitive vehicle components, a mechanical starting assembly, and a launch pad. The preferred embodiment comprises a container and a container lid with the MAV clamped to the lid. Also disposed on the container lid is a starting assembly. The lid which doubles as a launching pad with the attached MAV is removed from the container, placed on the ground, the MAV is started with the starting mechanism and launched. The arrangement minimizes the physical risk to the operator, minimizes weight of the total MAV system, consumes minimum space in the operators transport system, and eliminates dependence on supply lines for battery replacement or charging.

18 Claims, 7 Drawing Sheets

MICRO AIR-VEHICLE TRANSPORT CONTAINER AND LAUNCH SYSTEM

GOVERNMENT RIGHTS

The U.S. Government has a paid-up license in this invention and the right in limited circumstances to require the patent owner to license others on reasonable terms as provided for by the terms of MDA972-01-9-0018 awarded by the Defense Advanced Research Projects Agency (DARPA).

BACKGROUND OF THE INVENTION

1. Field of the Invention (Technical Field)

This invention relates to unmanned micro aerial vehicles (MAV) and more specifically to a self contained apparatus which combines packing, starting and launching mechanisms for the unmanned MAVs.

2. Background Art

Typically, an unmanned MAV needs a collection of ancillary equipment in order to properly execute a mission. This equipment can be heavy and bulky in a backpack carried by soldiers in the field. This is especially true for MAV's that require that they be started and launched in the field. Other approaches to this problem involve the use of a separate external battery to start motors and separate launching pads. There is currently no combined packing, starting and launching system. The other methods do not combine the three features of packing protection, starting and launching into one component. In addition, other approaches do not offer the safety aspects of the invention.

There are several prior art patents that disclose other unmanned micro aerial vehicles. These include U.S. Pat. No. 6,457,673; U.S. Pat. No. 6,286,410; U.S. Pat. No. 6,260,797; U.S. Pat. No. 6,506,237; U.S. Pat. No. 5,695,153. However, these patents differ in several ways from this invention. For example, U.S. Pat. No. 6,506,237 is a medical device used in hemo-dialyzers and heart-lung-machines. It is a pressure transmission invention not a micro-air vehicle invention. In addition, U.S. Pat. No. 6,457,673 is a mobile launcher, but does not fit into a portable container and must be launched from a trailer. There is also an electrical requirement which is mounted onto the trailer; the present invention does not require electricity or batteries.

The invention described in U.S. Pat. No. 6,286,410 is used to release a vehicle underwater to be propelled upward. U.S. Pat. No. 6,286,410 is used for launching missiles or other projectiles from under water using pressurized water to launch. This differs from the present invention in that this invention is not to be used underwater and does not use pressurized water to launch the MAV.

U.S. Pat. No. 6,260,797 is a transformable gun launched aero vehicle that has a ballistic projectile configuration and an aeroplane configuration and includes a cylinder forming a shell of the vehicle in the ballistic projectile configuration and fuselage of the vehicle in the aeroplane configuration. This invention differs from the present invention in that U.S. Pat. No. 6,260,797 is not contained in a transportable container and has differing launch methods. The present invention is not launched from a gun, mortar or tube as described in U.S. Pat. No. 6,260,797.

Finally, U.S. Pat. No. 5,695,153 is an unmanned aerial vehicle that is contained in a trailer and can be assembled using removable pins attached to a platform of lanyards. In the present invention the unmanned aerial vehicle can be contained in a soldiers backpack and there is no assembly involved. There are also no removable pins or other parts in the present invention. In addition, U.S. Pat. No. 5,695,153 uses an air compressor and air tanks where the present invention uses a spline and release cord or a pre-wound spring or an electric motor or battery.

The prior art differs from the present invention in that the present invention is a micro-air vehicle packaged in a container that can fit into a soldier's backpack. In addition, the launch system is affixed to the container lid and the MAV can be launched via a preloaded wound spring, a spline and release cord or an electric motor or battery.

SUMMARY OF THE INVENTION

Disclosure of the Invention

A MAV transport container and launching system provides the functions of packing protection of sensitive vehicle components, a mechanical starting system and a launch pad. The most significant novelty of this invention is the all-in-one feature that provides packing, starting and launching of a MAV, while minimizing the size and weight of a typical MAV containment system.

The preferred MAV transport container and launching system assumes short landing gear and comprises of a vehicle transport container affixed to a starting mechanism. The vehicle transport container also functions as a launching pad. The MAV is attached to the starting and launching pad and the transport container lid, while in transport mode. In addition, the landing gear provides the starting torque couple.

The transport container and launch system can also be used with landing gear lengths that prohibit their attachment in the transport state. In this case, the MAV is still mounted to the container lid for transport protection and quick set up. However, the MAV is removed while attached to the starting and launching plate so the gear can be attached. The MAV is then placed on the ground for launch.

For both embodiments, there are several methods for generating the starting torque. First, a spring wound, pulley mounted, pull cord can be used. Second, a preloaded hand wound spring can be used to spin the fan and motor. Third, an electric motor driven by an external power source can be used. For all starting systems, there must be a means to provide torque with the starting shaft.

A primary object of the present invention is to provide for an all-in-one starting system for a MAV that embodies a dual use vehicle transport container. The transport container mounts a starting mechanism and functions as a launching pad.

A primary advantage of the present invention is that it combines a packing, starting and launching system into a single container.

Another advantage of the present invention is that it minimizes the weight of the total MAV system.

Another advantage is that it minimizes the physical risk to the operator.

Yet another advantage is that it consumes minimum space in the operators transport system (most likely a backpack).

Yet another advantage is that it minimizes dependence on supply lines.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
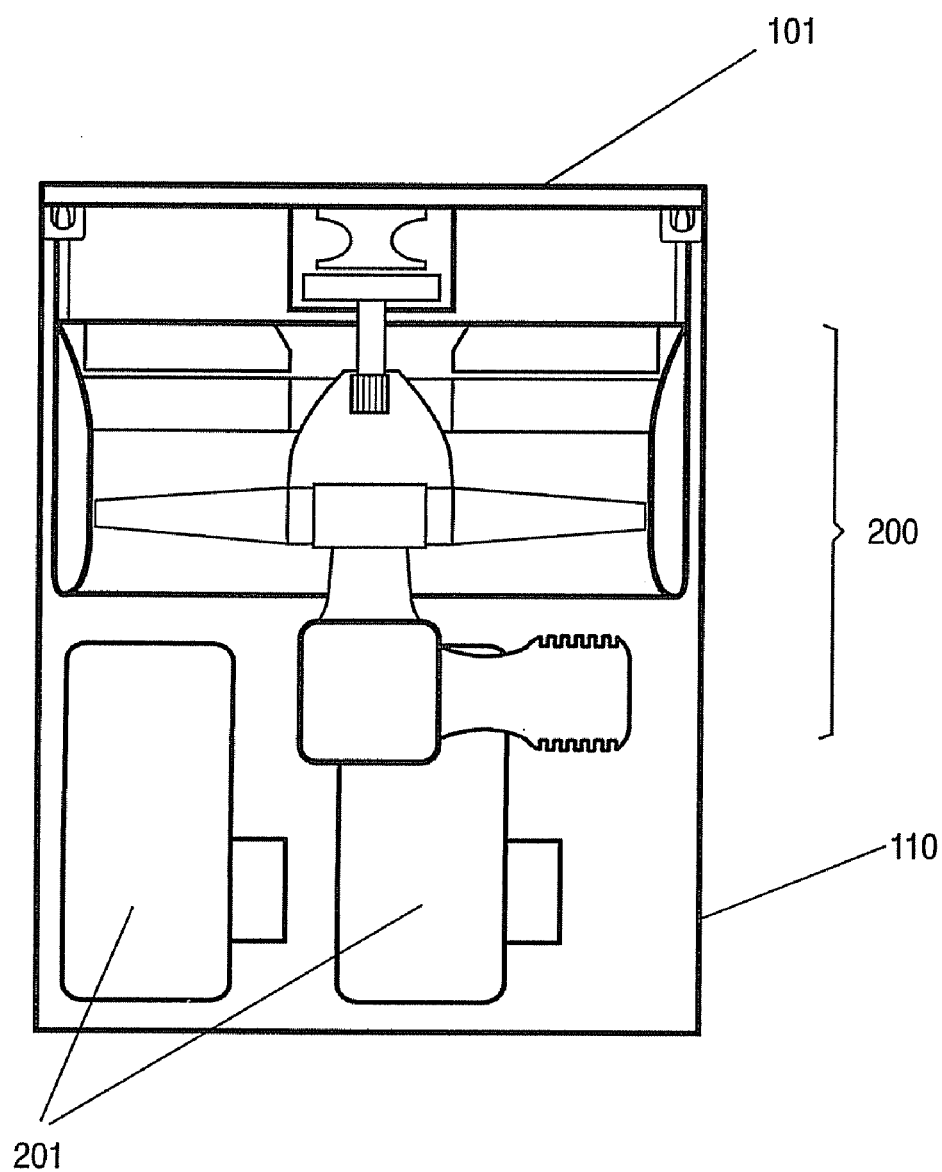
FIG. 1 shows the MAV in the transport container in a stowed configuration.

FIG. 1 shows MAV 200 in transport container 110 in a stowed configuration. In this figure, MAV 200 is in a disassembled state with MAV pods 201 located below the duct and engine assembly of MAV 200. Container 110 has container lid 101, which also serves as a launch pad. Container 110 is sized to fit within the constraints of an operators backpack.

Figure 2:
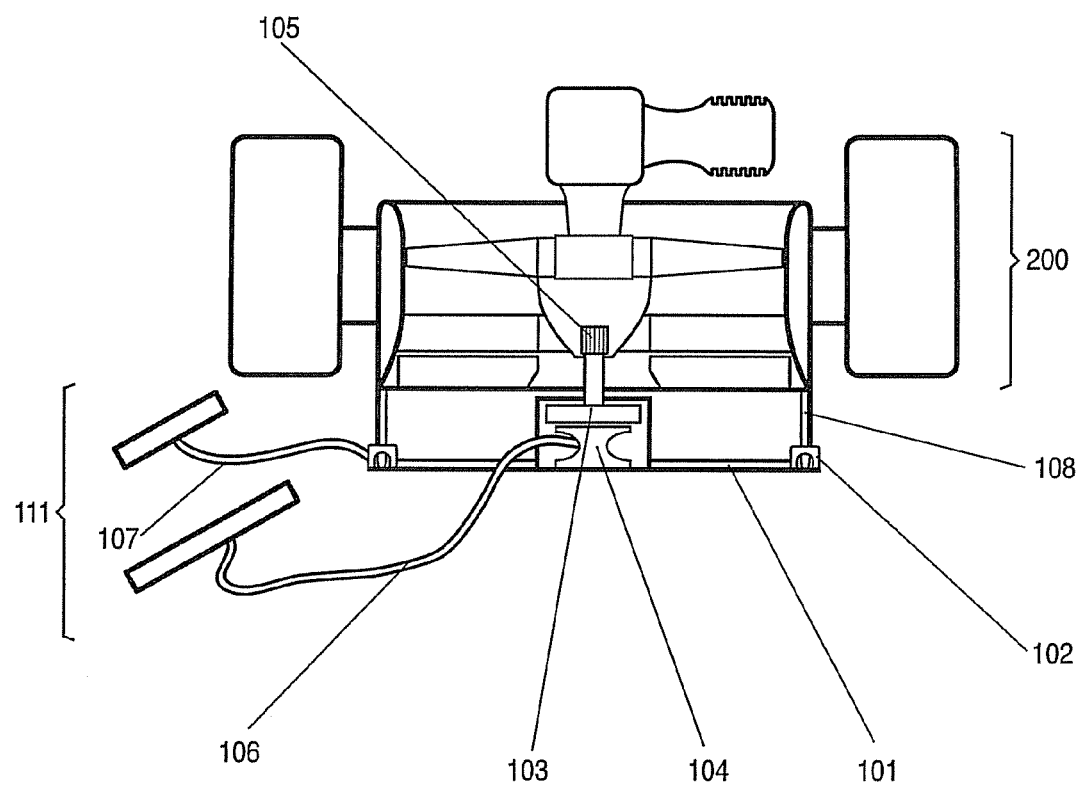
FIG. 2 shows a MAV and preferred launch starter system in a deployed configuration.

FIG. 2 shows MAV 200 and preferred launch starter system 111 in a deployed configuration. In this figure, MAV 200 is assembled on container lid 101, which becomes the launch pad. This figure shows starter system 111 and its components, starting lanyard 106, lanyard pulley 104, ratchet and gear 103, launch clamps 102, spline 105 and release cord 107. Starter system 111 is attached to container lid 101. In this embodiment short landing gear or legs 108 are used whereby MAV 200 remains attached to container lid 101 or launching pad when deploying MAV 200. In this embodiment the starting torque couple is provided by landing gear 108. MAV 200 is attached to starter system 111 via launch clamps 102. In this embodiment, an operator would remove container lid 101 from transport container 110 with MAV 200 attached. He would then attached MAV pods 201, fuel MAV 200 and activate Ground Control Station. Starting lanyard 106 would be pre-wound by a self-winding recoil spring. Operator would then place one foot on container lid 101, which serves as a launch pad, and pull starting lanyard 106 to start MAV 200. MAV 200 would stay on the ground until operator pulls release cord 107, which release launch clamps 102. Then when MAV 200 returns from its mission, operator detaches MAV pods 201, places them in transport container 110 and attaches MAV 200 to container lid 101 with launch clamps 102. Operator then inverts container lid 101 with MAV 200 attached and places container lid 101 on top of transport container 110.

Figure 3:
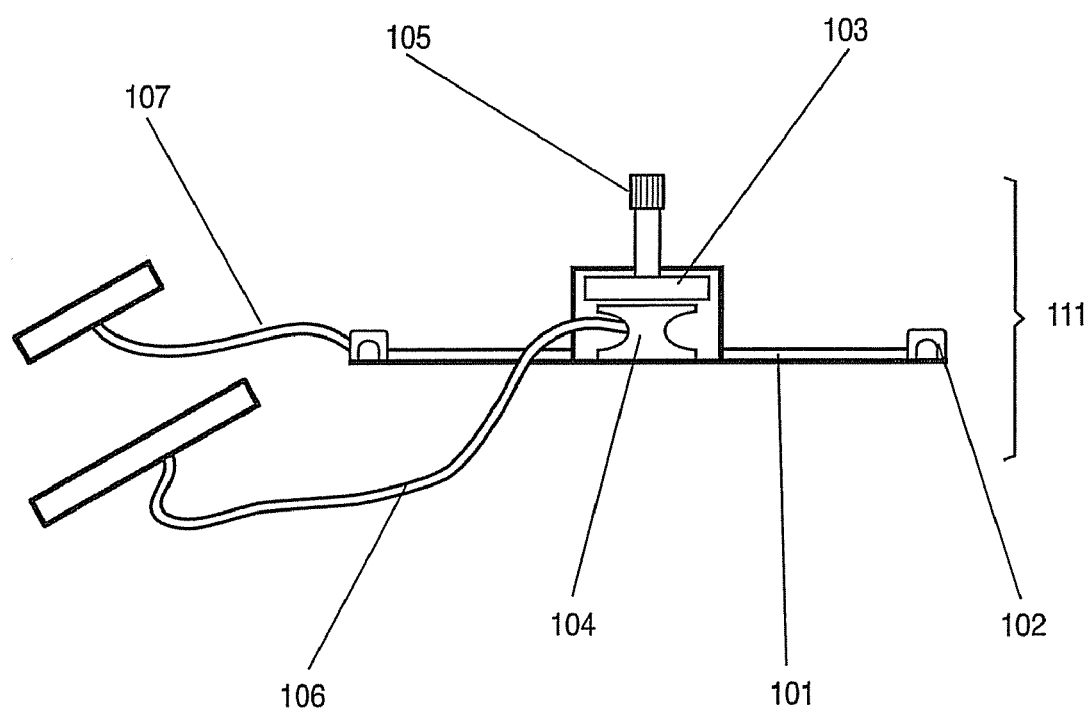
FIG. 3 shows the preferred launch and starter system of FIG. 2 without a MAV affixed to the system.

FIG. 3 shows the preferred launch and starter system 111 of FIG. 2 without MAV 200 affixed to the system. In this figure, starter system 111 includes the container lid launch plate assembly 101. Starter system 111 generates torque through an operator pulling on starting lanyard 106. Starting lanyard 106 wraps around lanyard pulley 104. Starting lanyard 106 is maintained in a taut position around lanyard pulley 104 by spring wound ratchet and gear 103. When starting lanyard 106 is pulled, the torque applies to MAV 200 through spline 105 that drops from contact with MAV 200 when the engine starts. MAV 200 will stay on the ground until release cord 107 is pulled releasing launch clamps 102.

Figure 4:
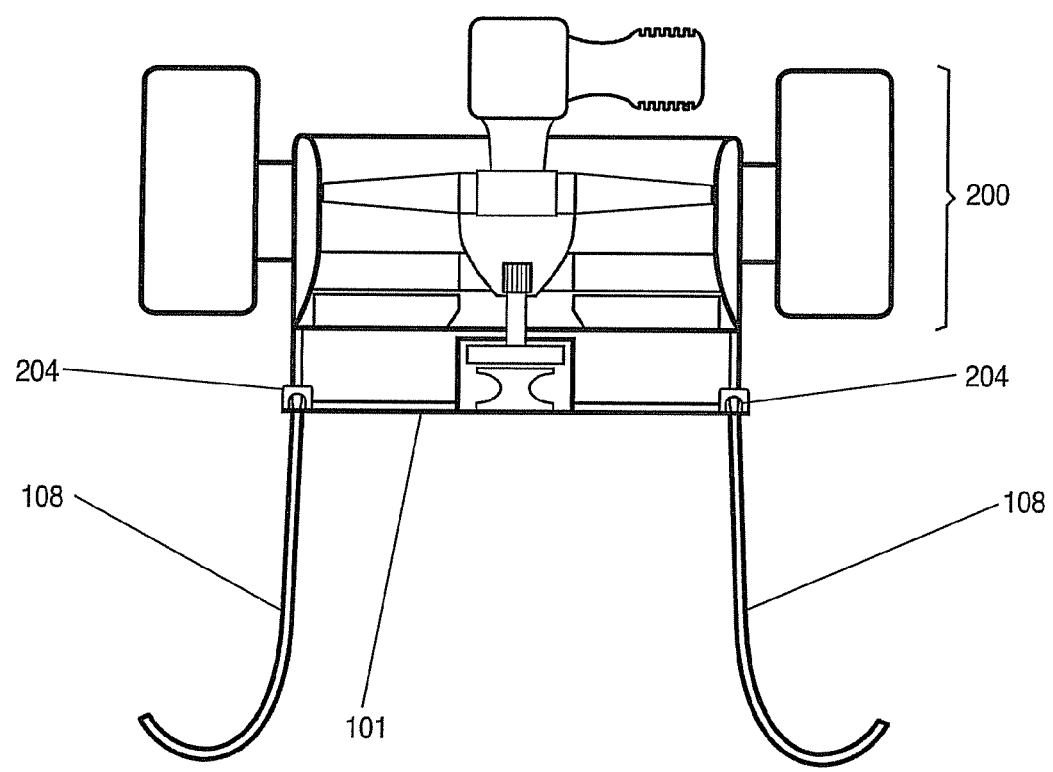
FIG. 4 shows an alternative embodiment of the container launch pad and starter system.

FIG. 4 shows an alternative embodiment of container lid launch plate assembly 101 and starter system 111 with MAV 200 affixed to container lid launch assembly 101. This embodiment supports varying lengths of MAV 200's landing legs 108 (which are attached during setup), however the set up for launching remains easy and quick. In this alternative embodiment of a dual use container based starting and launching system provides for landing gear lengths that prohibit their attachment in the transport state. In this case MAV 200 is removed while attached to the starting and launching plate (container lid 101), landing gear 108 is attached and the vehicle placed on the ground. Container lid 101 is also used to apply starting torque to MAV 200. FIG. 4 shows the alternate lid and starting plate 101 with supporting structures to MAV landing legs 108, attach points 204. Attach points 204 provide the dual function of transport protection of the control vanes below the duct and torque couple points. In this embodiment the starting torque couple is provided by launch pad attachment points to MAV 200 either at the air-vehicle landing gear attachment points or at the stator center cone.

Figure 5:
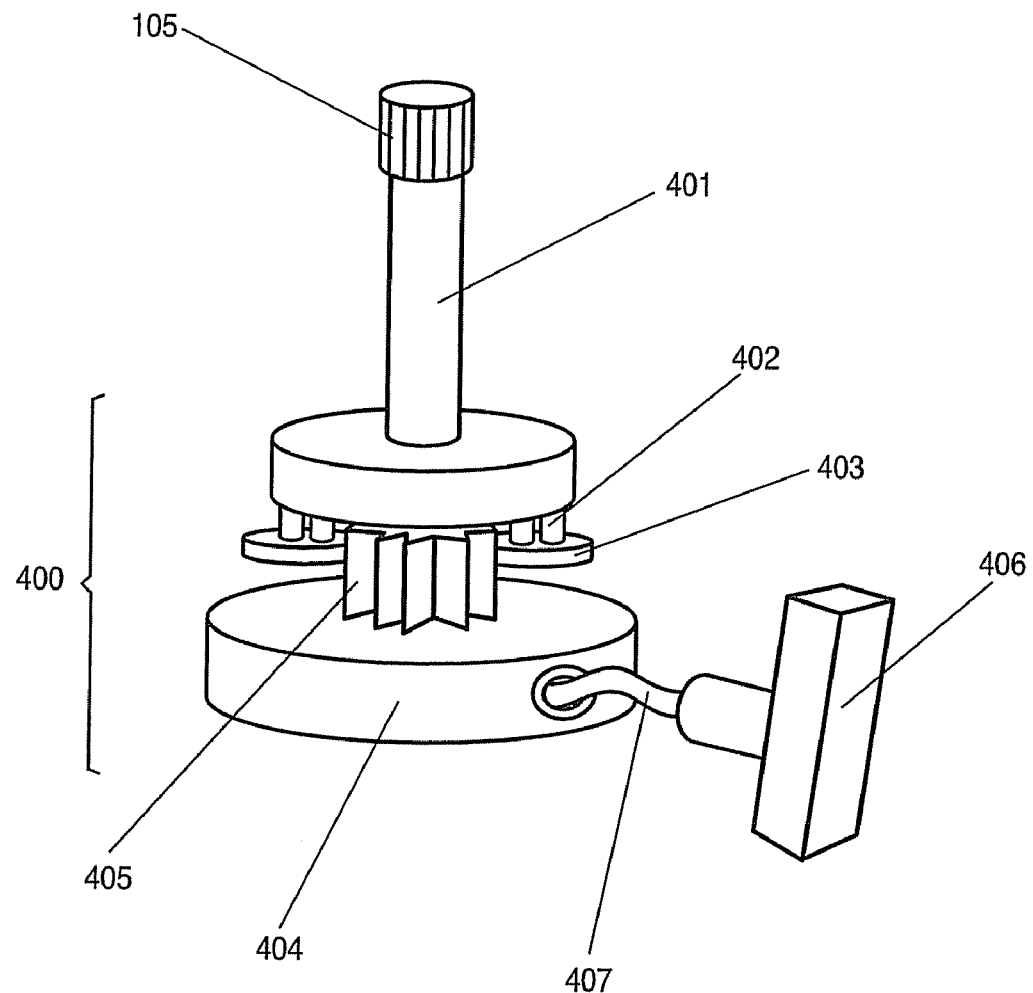
FIG. 5 shows the preferred embodiment of the pull cord torque generation system.

FIG. 5 shows the preferred embodiment of the pull cord torque generation system. In this embodiment, torque generation system 400 is affixed to container lid 101. The pull cord torque generation system transfers torque through a shaft 401 connected to the MAV engine (not shown) through spline 105, as discussed above. Torque is generated by operator placing one hand the container lid 101 and pulling on pull handle 406 with the other hand. The force from pull handle 406 transfers to pulley with coil spring recoil 404 by lanyard 407. Torsion springs 402 work in conjunction with ratcheting pawls with counterweights 403 to lock the pulling force during the outward stroke of the operator but release when the engine (not shown) fires. The engine starts and overruns the start mechanism spinning the counterweighted pawls fast enough so they completely leave contact from the ratchet gear. Alternatively, the pulling action pre-loads a coil spring that releases the spinning action when it is fully loaded thus spinning the output shaft to the engine. Ratcheting pawls with counterweights 403, are disengaged from the splined hub 405, by centrifugal force once the engine starts, spinning the output shaft 401 to the engine at idle RPM.

Figure 6:
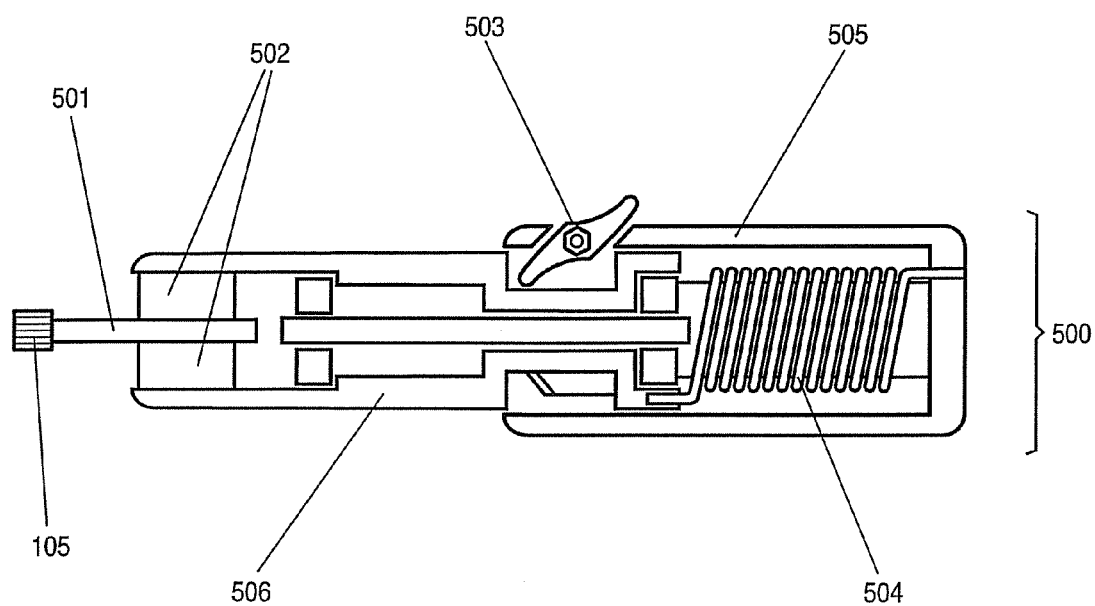
FIG. 6 shows an alternative embodiment of a pull torque generation system using pre-loaded springs.

FIG. 6 shows an alternative embodiment of a twist torque generation system using pre-loaded springs. This embodiment uses a hand wound spring preloaded such that a release mechanism will spin the fan and motor on the MAV (not shown). In this configuration, operator pre-loads torsion springs 504 by placing one hand on front housing 506 and twisting rear housing 505 with the other hand. Operator then connects output shaft 501 to the MAV engine via spline 105, releasing the torque through ratcheting pawl 503. Sprag clutches 502 allow for over-running when the engine starts.

Figure 7:
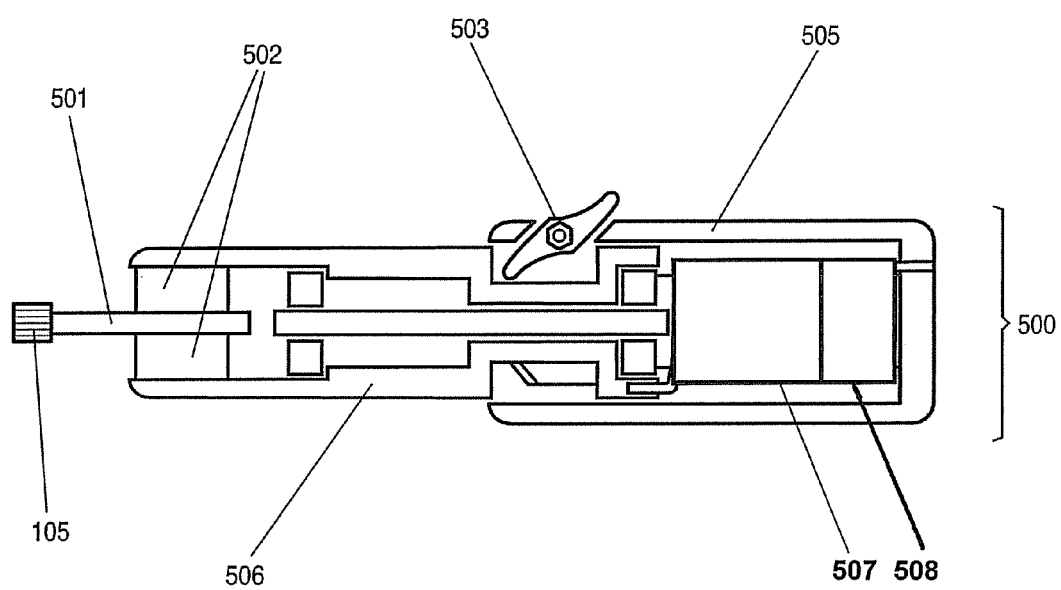
FIG. 7 shows another alternative embodiment of an example pull torque generation system.

The third torque generation device is an electric motor and battery, as shown in FIG. 7. It is similar to FIG. 6, a spring pre-load torque device in connection to a MAV. However, in place of torsion springs 504 and counter rotating cylinders, it contains an electric motor 507 and a battery 508.

Once a mission is complete, the operator merely needs to land MAV 200, remove landing gear 108 (if long landing gear is used), affix MAV 200 to container lid 101 via launch clamps 102 and place the entire assembly inside of container 110. The system is now ready for re-fueling, relocation and re-deployment.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A self-contained apparatus for containing, starting and launching a micro-air vehicle (MAV), the self-contained apparatus comprising:
    a transport container for removeably encasing the MAV, the transport container including a removable lid that encloses the transport container and serves as a launch pad for the MAV; and
    a MAV starter disposed on said transport container, the MAV starter coupled to the removable lid such that the MAV starter and the removable lid are pre-configured for launching the MAV, wherein the removable lid and the MAV are removed from the transport container for launching the MAV using the removable lid as the launch pad.

2. The self-contained apparatus of claim 1 wherein said MAV starter comprises a splined shaft for insertion and release from the MAV.

3. The self-contained apparatus of claim 1 wherein said MAV starter comprises a self-winding recoil spring.

4. The self-contained apparatus of claim 1 wherein said MAV starter comprises a pre-loaded spring.

5. The self-contained apparatus of claim 1 wherein said MAV starter comprises an electric motor and battery.

6. The self-contained apparatus of claim 1 wherein said container further comprises a MAV containment and release clamp assembly.

7. The self-contained apparatus of claim 6 wherein said MAV containment and release clamp assembly comprises a release cord.

8. The self-contained apparatus of claim 1 wherein said MAV is affixed to said starter when configured for transport.

9. The self-contained apparatus of claim 1, wherein the transport container is a backpack.

10. The self-contained apparatus of claim 1, further comprising landing gear coupled to the MAV.

11. The self-contained apparatus of claim 10, further comprising removable lid attach points at which to attach the landing gear.

12. The self-contained apparatus of claim 1, wherein the removable lid has a first side and a second side, and wherein the MAV is attached to the first side of the removable lid, and wherein the MAV is positioned within the transport container by enclosing the transport container with the removable lid such that the first side of the removable lid faces into the transport container.

13. The self-contained apparatus of claim 1, wherein the transport container has a top and a bottom, and wherein the removable lid encloses the top of the transport container.

14. The self-contained apparatus of claim 1, further comprising MAV pods positioned within the transport container.

15. The self-contained apparatus of claim 1, wherein the MAV pods are attachable to the MAV after removing the MAV from the transport container.

16. The self-contained apparatus of claim 1, wherein the MAV comprises an engine assembly.

17. The self-contained apparatus of claim 1, wherein the MAV is controllable via a ground control station.

18. The self-contained apparatus of claim 1, wherein the transport container is a portable transport container.

\* \* \* \* \*